US006577943B2

(12) United States Patent

Nakao et al.

(10) Patent No.: US 6,577,943 B2

(45) Date of Patent: Jun. 10, 2003

(54) SYSTEM FOR DISTRIBUTING ROAD SURFACE INFORMATION, SYSTEM FOR COLLECTING AND DISTRIBUTING VEHICLE INFORMATION, DEVICE FOR TRANSMITTING VEHICLE INFORMATION AND PROGRAM FOR CONTROLLING VEHICLE

(75) Inventors: Yukio Nakao, Kobe (JP); Hiroshi Yoshinaga, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 69 days.

(21) Appl. No.: 09/838,241

(22) Filed: Apr. 20, 2001

(65) Prior Publication Data

US 2001/0045891 A1 Nov. 29, 2001

(30) Foreign Application Priority Data

Apr. 21, 2000 (JP) ...................................... 2000-120971

(51) Int. Cl.[7] ........................ G08B 1/123; G01N 19/02; G08G 1/09

(52) U.S. Cl. ........................ 701/80; 701/208; 340/988; 180/116

(58) Field of Search .......................... 701/80, 208, 207, 701/23, 25, 35; 340/988, 905, 601, 602, 580, 581, 901, 990; 702/3; 73/9, 146; 180/116

(56) References Cited

U.S. PATENT DOCUMENTS

| | | | | | |
|---|---|---|---|---|---|
| 4,986,384 | A | * | 1/1991 | Okamoto et al. | 180/167 |
| 5,774,070 | A | * | 6/1998 | Rendon | 340/905 |
| 5,982,325 | A | * | 11/1999 | Thornton et al. | 342/357.07 |
| 6,122,573 | A | * | 9/2000 | Higashi et al. | 701/23 |
| 6,173,231 | B1 | * | 1/2001 | Chojnacki | 701/208 |
| 6,276,189 | B1 | * | 8/2001 | Hurson | 73/9 |
| 6,326,893 | B1 | * | 12/2001 | Boschung, Jr. et al. | 340/601 |
| 6,359,571 | B1 | * | 3/2002 | Endo et al. | 340/988 |

* cited by examiner

*Primary Examiner*—Tan Q. Nguyen

*Assistant Examiner*—Dalena Tran

(74) *Attorney, Agent, or Firm*—Birch, Stewart, Kolasch & Birch, LLP

(57) ABSTRACT

A system for distributing road surface information comprising means for sensing numerical information on slipperiness of a road surface; means for sensing positional information of the travelling vehicle; means for transmitting the numerical information and/or positional information from the vehicle; means for collecting the information transmitted by a plurality of vehicles; means for preparing road surface information of a road on the basis of each information; means for distributing the road surface information also to a vehicle other than the vehicle; and means for receiving the distributed road surface information. By changing a parameter of road surface information in a vehicle movement control system such as an ABS or a VSC, the performance of the control can be improved.

7 Claims, 3 Drawing Sheets

SYSTEM FOR DISTRIBUTING ROAD SURFACE INFORMATION, SYSTEM FOR COLLECTING AND DISTRIBUTING VEHICLE INFORMATION, DEVICE FOR TRANSMITTING VEHICLE INFORMATION AND PROGRAM FOR CONTROLLING VEHICLE

BACKGROUND OF THE INVENTION

The present invention relates to a system for distributing road surface information, a system for collecting and distributing vehicle information and a device for transmitting vehicle information, and a program for controlling a vehicle. More particularly, the present invention relates to a system for distributing road surface information, a system for collecting and distributing vehicle information and a device for transmitting vehicle information, and a program for controlling a vehicle by which performance of the driving control of a vehicle can be improved on the basis of information on slipperiness such as a friction coefficient of the road surface where the vehicle travels.

When a vehicle suddenly accelerates or stops on a slippery road, there is a risk that the tires slip and spin. By sudden movements of the steering wheel, there is a possibility that the vehicle skids or spins.

Conventionally, there have been proposed techniques such as an antilock braking system (ABS) for reducing a brake torque acting on wheels to prevent the wheels from being locked before a damping force between tires and a road exceeds the maximum value and the tires are locked, thereby controlling the rotational speed of the wheels at which the maximum damping force can be obtained (Japanese Unexamined Patent Publication Nos. 99757/1985 and 249559/1989 and the like.)

For example, in the control of the antilock braking system, a slip ratio is calculated from a judged vehicle speed and a detected wheel speed (rotational speed) and, after that, a braking force is controlled so that the calculated slip ration coincides with a preset reference slip ratio. In such a manner, the maximum damping force is followed.

In the control of such an ABS or the like, a friction coefficient $\mu$ on a road is used, and the friction coefficient $\mu$ of the road surface during the travelling is calculated, and the data is used for the purpose of controlling its own vehicle.

However, the friction coefficient sensed by the travelling vehicle is a data which relates to the road surface of the part where the vehicle has already traveled, and the friction coefficient of the road surface where the vehicle will travel from now is required in controlling the vehicle.

For example, it is considered that, if data on the friction coefficient of a vehicle which is travelling ahead or a vehicle which has already traveled can be utilized by a vehicle which will travel from now, a more ideal vehicle movement control can be carried out.

In view of the aforementioned circumstances, an object of the present invention is to provide a system for distributing road surface information, a system for collecting and distributing vehicle information and a device for transmitting vehicle information, and a program for controlling a vehicle by which the efficiency of the driving control of a vehicle can be improved on the basis of information on slipperiness such as a friction coefficient of the road surface where the vehicle travels.

SUMMARY OF THE INVENTION

In accordance with the present invention, there is provided a system for distributing road surface information comprising means for sensing numerical information on slipperiness of a road surface while a vehicle is travelling; means for sensing positional information of the travelling vehicle; means for transmitting the numerical information and/or positional information from the vehicle; means for collecting the information transmitted by a plurality of vehicles; means for preparing road surface information of a road on the basis of each information; means for distributing the road surface information also to a vehicle other than the vehicle; and means for receiving the distributed road surface information.

In accordance with the present invention, there is also provided a system for collecting and distributing vehicle information characterized by collecting information which is transmitted from a travelling vehicle and needed in preparing road surface information, and distributing the road surface information also to a vehicle other than the vehicle.

In accordance with the present invention, there is further provided a device for transmitting vehicle information comprising means for sensing numerical information on slipperiness of a road surface while a vehicle is travelling; means for sensing positional information of the travelling vehicle; and means for transmitting the numerical information and/or positional information from the vehicle.

In accordance with the present invention, there is still further provided a program for controlling a vehicle characterized by allowing a computer to function as means for sensing numerical information on slipperiness of a road surface while the vehicle is travelling, means for controlling the vehicle on the basis of numerical information on slipperiness of a road surface received by the vehicle, and means for correcting the received numerical information on the slipperiness of the road surface by comparing the numerical information on the slipperiness of the road surface received by the vehicle with the numerical information on a road surface friction coefficient sensed during the travel, for improving performance of driving control of the vehicle on the basis of the road surface information.

DETAILED DESCRIPTION

Hereafter, a distribution system and a device for transmitting vehicle information, and a vehicle controlling program according to the present invention will be described.

Figure 1:
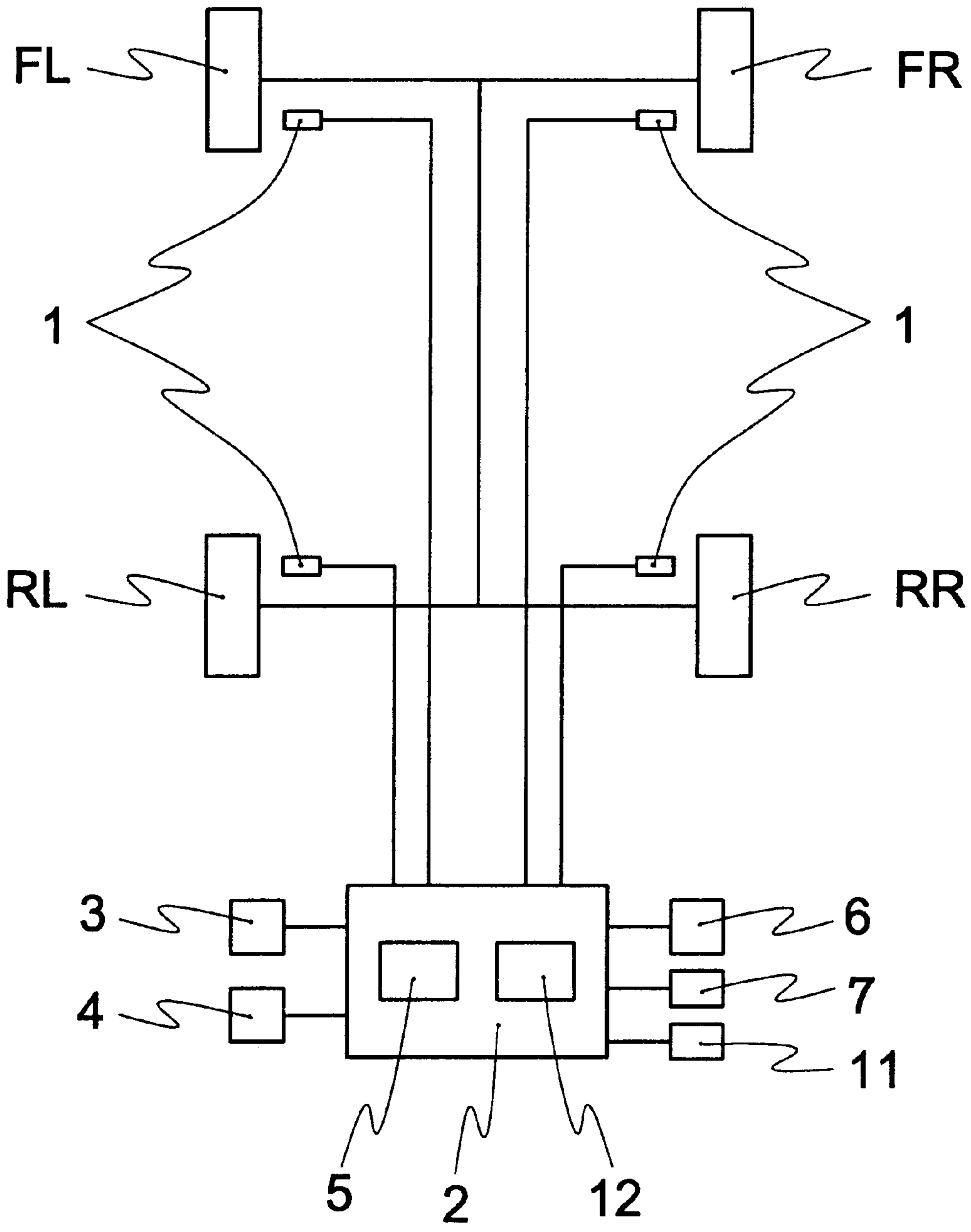
FIG. 1 is a block diagram illustrating one embodiment according to a system for distributing road surface information of the present invention.
Figure 2:
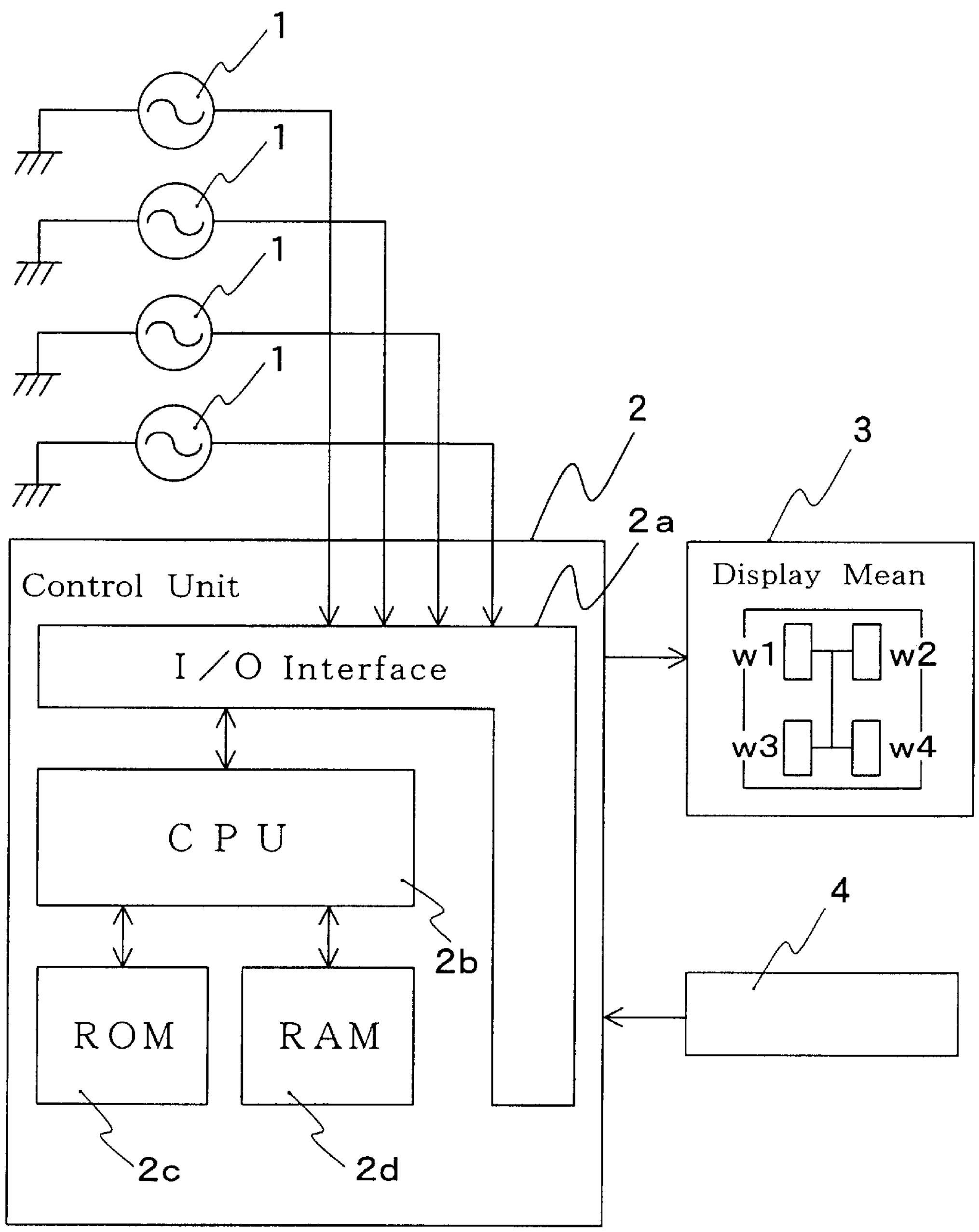
FIG. 2 is a block diagram illustrating an electrical arrangement of a device for judging road surface friction coefficient in FIG. 1.

As shown in FIG. 1, a vehicle has rotational speed detecting means 1 provided for each of tires FLW, FRW, RLW, and RRW of a four-wheeled vehicle to periodically detect the rotational speeds of the tires. Outputs of the rotational speed detecting means 1 are transmitted to a control unit 2 such as ABS. To the control unit 2, as shown in FIG. 2, a display 2 as display means constructed by a liquid crystal display device, plasma display device, CRT or the like is connected. Reference numeral 4 denotes an initialization switch operated by the driver.

The rotational speed detecting means 1 takes the form of, for example, a wheel speed sensor for measuring a rotational speed from the number of rotation pulses generated by using an electromagnetic pickup or the like, or an angular velocity sensor for measuring a rotational speed from a voltage generated by using rotation by a dynamo electric.

The control unit 2 includes, as shown in FIG. 2, an I/O interface 2*a* necessary for the transmission/reception of signals to/from an external device, a CPU 2*b* functioning as the center of computing processes, a ROM 2*c* in which a control operation program of the CPU 2*b* is stored, and a RAM 2*d* to which data is temporarily written when the CPU 2*b* performs a control operation and from which the written data or the like is read.

Figure 3:
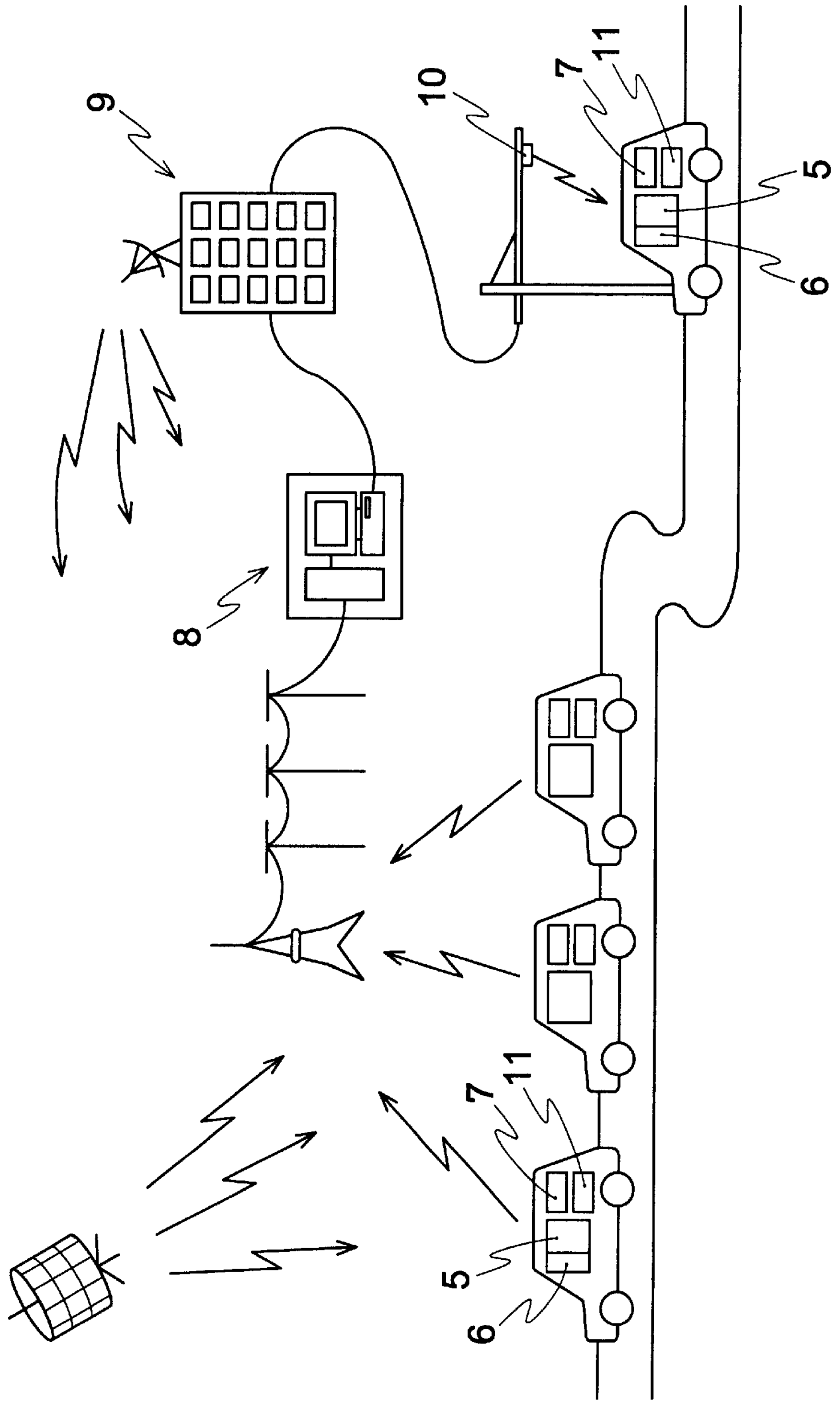
FIG. 3 is a model view illustrating an intervehicle communication in the system for distributing road surface information of the present invention.

As shown in FIGS. 1 and 3, the system for distributing road surface information according to this embodiment includes means 5 for sensing numerical information on slipperiness of a road surface while a vehicle is travelling; means 6 for sensing positional information of a vehicle which is travelling, such as a car navigation device using a GPS antenna or the like; means 7 for transmitting the numerical information and/or positional information from the vehicle; means 8 for collecting the information transmitted by a plurality of vehicles, such as a host computer of a VICS (road transportation information communication system) via the internet; means 9 of the VICS for preparing road surface information of a road on the basis of each information; means 10 comprising an external transmitter such as a beacon or an FM transmitter, for distributing the road surface information also to a vehicle other than the vehicle; and means 11 for receiving the distributed road surface information, such as a beacon antenna. Here, in the present embodiment, a system for distributing road surface information will be described; however, the present invention can be applied as a system for collecting and distributing vehicle information or as a device for transmitting vehicle information. Further, in the present specification, the distributed information refers also to the information which is distributed to the vehicle which has transmitted individual information forming the basis for the distributed information.

Further, a program for controlling a vehicle according to the present embodiment allows a control unit 2, a computer, to function as means for sensing numerical information on slipperiness of a road surface while the vehicle is travelling, means for controlling the vehicle on the basis of numerical information on slipperiness of a road surface received by the vehicle, and means for correcting the received numerical information on the slipperiness of the road surface by comparing the numerical information on the slipperiness of the road surface received by the vehicle with the numerical information on a road surface friction coefficient sensed during the travel, for improving performance of the driving control of the vehicle on the basis of the road surface information.

As the means 5 for sensing numerical information, there can be employed a friction coefficient judging device capable of numerically expressing a level of slipperiness of a road surface on the basis of behavior of tire rotation caused by friction coefficient between a tire and the road surface. The friction coefficient judging device is firstly characterized by comprising rotational speed detecting means for periodically detecting rotational speeds of four tires of a vehicle; first computing means for computing a slip ratio from measurement values of the rotational speed detecting means; second computing means for obtaining a relational formula between the slip ratio and acceleration/deceleration of the vehicle; and friction coefficient judging means for judging a coefficient of friction occurring between a road and a tire on the basis of a slope of the relational formula obtained by the second computing means. The device is secondly characterized by judging a friction coefficient occurring between a road and a tire from a result obtained by comparing a slope of the relational formula with a preset threshold. Further, the device is thirdly characterized by comprising rotational speed detecting means for periodically detecting rotational speeds of four tires of a vehicle; first computing means for computing acceleration/deceleration of the vehicle and a slip ratio of tires from measurement values of the rotational speed detecting means; moving-average calculating means for calculating a moving average from the acceleration/deceleration of the vehicle and the slip ratio in predetermined time; weighted moving-average calculating means for performing moving average on the moving average value obtained by the moving-average calculating means; second computing means for obtaining a relational formula between the acceleration/deceleration of the vehicle and the slip ratio from weighted moving averages obtained by the weighted moving average calculating means; and friction coefficient judging means for judging a coefficient of friction occurring between a road and a tire on the basis of a slope of the relational formula obtained by the second computing means. The device is fourthly characterized by judging a friction coefficient occurring between a road and a tire from a result obtained by comparing a slope of the relational formula with a preset threshold.

In accordance with the spread of car navigation devices and the development of technique in recent years, the precision of judging the current position of a vehicle is making tremendous improvements. The aforesaid friction coefficient judging means converts the level of slipperiness of the road surface during the travelling into a numerical value on the basis of the features of the tire revolution behavior caused by the influence of the friction coefficient between the tire and the road surface, and can sense the slipperiness of the road surface at all times in a normal travelling condition. Therefore, data can be collected at all times from all the vehicles which are travelling. The aforesaid car navigation device can be one which senses the travelling position by utilizing an antenna of a GPS (global position-measuring system) or the like, inputs the geographical data of the surrounding places from a CD-ROM or the like into a car navigator body to display the geographical information on a display panel or the like by a process of a map display routine, and receives road information from an external transmitter such as a beacon or an FM transmitter placed to the road via a beacon antenna or the like to additionally display the road information on the display panel by a process of a display routine of the navigator body.

By combining the aforesaid friction coefficient judging means with the technique of car navigation devices, the numerical value of the level of the slipperiness of the road surface and the travelling position can be joined.

In order to transmit the numerical information on the slipperiness of the road surface and the positional information of the travelling vehicle by a communication means such as a wireless telephone line, e.g. a portable telephone or a PHS, or a similar wireless device while the vehicle is travelling, a transmitter is mounted, for example, on a vehicle which has made a contract for the purpose of giving an alarm or performing a control by utilizing the information from other vehicles, and the information on the road surface of the road which is varying at each time is concentrated and managed in a host computer by using the wireless telephone line and the internet. Further, if the information on the slipperiness of the road surface can be collectively transmitted by a time batch process in transmitting the information from the aforesaid vehicle, the information can be correctly transmitted even under a discontinuous electromagnetic wave condition. Further, since a newer information is evaluated as having a higher reliability, the data of the past is replaced with a new one.

By combining the aforesaid numerical information with the positional information, the information on the road surface can be added onto the road map. The data of this road surface information is replaced with a new one each time a vehicle passes on the road, and a highly reliable road surface information can be obtained by performing a mathematical process such as taking an average or a deviation or by classifying the data depending on the type of the tire or vehicle.

This road surface information can be distributed to each vehicle by distributing the information to a receiving system mounted on the vehicle travelling in the corresponding area, or by distributing the information by an intervehicle communication means such as a VICS system (road transportation information system). Also, the driver can be warned by the aforesaid display device 3 on the basis of the numerical information. Further, the vehicle can be controlled on the basis of the numerical information, thereby improving the efficiency of the driving control of the vehicle.

Here, the friction coefficient of the road surface is determined by the tire and the road surface, and it is specific to individual vehicles. Therefore, as illustrated in FIG. 1, in order to take this information as information of its own vehicle, for example, if the numerical information (parameter) on the friction coefficient that its own vehicle has sensed is compared with the numerical information of the current place in the distributed information, the distributed numerical information on the friction coefficient of the road where the vehicle will travel from now can be corrected to numerical information for its own vehicle by a correcting means 12 incorporated in the control unit 2. In other words, by comparing the numerical information on the slipperiness of the road surface that the vehicle has received with the numerical information on the road surface friction coefficient that the vehicle has sensed while travelling, the numerical information on the slipperiness of the road surface that the vehicle has received is corrected.

Hereafter, the present invention will be described with reference to preferred embodiments thereof; however, the present invention is not limited to these embodiments alone.

EXAMPLE 1

This embodiment is carried out on the basis of the following procedures ① to ③.

① Data form transmitted from vehicle A

| positional information | road surface information | information on vehicle |
|---|---|---|
| X1A, X2A | Y1A, Y2A | ZA |

② Process by a host computer on vehicle A, vehicle B, and vehicle C

| area data | positional information | road surface information |
|---|---|---|
| X1 | X1A, X1B, X1C | Y1A, Y1B, Y1C |
| X2 | X2A, X2B, X2C | Y2A, Y2B, Y2C |
| | information on vehicle | calculation of representative value by classification or taking an average |
| | ZA, ZB, ZC | Y1 |
| | ZA, ZB, ZC | Y2 |

Here, the range of precision of the aforesaid area data, e.g. the positional information such as travelling on asphalt or on a pressed snow road, is about several ten meters.

③ Data form distributed by intervehicle communication data distributed to vehicle D (information of its own vehicle ZD) which is travelling in the X1 area

| positional information | road surface information |
|---|---|
| X1D | Y1D |

First, Example will be shown as follows in which the friction coefficient of the road surface on which the vehicle will travel from now is sensed on the basis of the road surface information obtained by the vehicle. Referring to FIG. 3, an experiment was carried out under a condition in which the road surface changes from asphalt X1 to a pressed snow road X2 in the neighborhood of the Nayoro (Hokkaido) test course of Sumitomo Rubber Industries, Ltd. by using information-offering vehicles A (Chronos of Mazda Motor Corporation), B (Corolla of TOYOTA MOTOR CORPORATION), and C (Celsio of TOYOTA MOTOR CORPORATION).

Representative values Y1, Y2 of the road surface $\mu$ of the asphalt X1 and the pressed snow road X2 by the three information-offering vehicles A, B, and C were calculated by taking an average. These representative values Y1, Y2 were simple averages of the three vehicles, because all the three vehicles were found to be passenger cars by the information ZA, ZB, and ZC on the vehicles. These average values are the road surface information to be distributed. The results are shown in Table 1.

TABLE 1

| | Friction coefficient sensed by each vehicle | |
|---|---|---|
| | Asphalt X1 | Pressed snow road X2 |
| Information-offering vehicle A | 0.88(Y1A) | 0.52(Y2A) |
| Information-offering vehicle B | 0.79(Y1B) | 0.46(Y2B) |
| Information-offering vehicle C | 0.92(Y1C) | 0.57(Y2C) |
| Averaging process | 0.86(Y1) | 0.52(Y2) |

Next, the road surface $\mu$ (Y1D) when the vehicle D (Sheema of NISSAN MOTOR CO., LTD.) that receives the information has traveled on the same asphalt X1 is sensed, and is compared with the received information to calculate the estimated value (Y2D) of the pressed snow road X2. The result is shown in Table 2.

TABLE 2

| | Received information | | | Estimated |
|---|---|---|---|---|
| | Asphalt | Pressed snow road | Sensed value of its own vehicle Asphalt | value Pressed snow road |
| Information-offering vehicle D | 0.86(Y1) | 0.52(Y2) | 0.89(Y1D) | 0.54 |

The road surface $\mu$ (Y1D) on the asphalt X1 for the aforesaid information-receiving vehicle D is 0.89, and the road surface $\mu$ (Y1) of the received information is 0.86. At this time, the information-receiving vehicle D also receives information that the road surface $\mu$ (Y2) is 0.52 as the road surface information of the road where the vehicle D will travel from now. If the road surface $\mu$ of the pressed snow road where the vehicle D will travel from now is calculated by simple proportional allotment, the estimated value (Y2D) of the pressed snow road will be 0.54, whereby the road surface information can be recognized before the vehicle D travels on the pressed snow road X2.

Here, if it can be recognized as numerical information that the road surface $\mu$ of the road on which the vehicle D will travel from now will decrease, the driver can take a danger-evading measure such as dropping the speed before travelling on the slippery road by being warned on the basis of this numerical information.

In this information, only the numerical information is given; however, a LED or a warning sound might be interlocked on the basis of this numerical information to warn the driver.

EXAMPLE 2

Next, Example will be shown on the case where the aforesaid road surface information is taken in when the aforesaid information-receiving vehicle D starts braking on the asphalt and proceeds onto the pressed snow road and on the case where the road surface information is not taken in.

The braking distance of the case where the road surface information is applied to the ABS control and the ABS braking distance by the conventional method with a fixed friction coefficient will be compared. By allowing the slipping ratio used in the ABS program by the aforesaid information-receiving vehicle D to be variable by the road surface $\mu$, the system was changed so that the road surface information could be taken in, and evaluation was carried out. The result is shown in Table 3.

TABLE 3

| Proceeding speed | Braking distance in the case where $\mu$ is fixed in a state of being high | Braking distance in the case where the slipping ratio corresponds to the low $\mu$ |
|---|---|---|
| 30 km/h | 11.4 m | 8.8 m |

As shown in Table 3, an effect of reduced braking distance was obtained. Therefore, if the road surface $\mu$ of the road where the vehicle will travel from now is low, numerous effects are expected by performing a control to forcibly drop the vehicle speed on the basis of this road surface information or applying the road surface information to the VSC or the like which is a vehicle movement control.

As described above, according to the present invention, by changing a parameter of road surface information in a vehicle movement control system such as an ABS or a VSC or taking the road surface information into the system, the performance of the control can be improved.

Further, the vehicle which has obtained this information can warn the driver by giving an alarm into the car if the information is such that the friction coefficient of the road surface of the road on which the vehicle will travel from now is low and shows an anticipated danger.

Therefore, usefulness of the present invention will increase more and more in accordance with the spread of the ITS in the future.

What is claimed is:

1. A system for distributing road surface information comprising:

means for sensing numerical information on slipperiness of a road surface while a vehicle is travelling;

means for sensing positional information of the travelling vehicle; means for transmitting the numerical information and/or positional information from the vehicle;

means for collecting the information transmitted by a plurality of vehicles; means for preparing road surface information of a road on the basis of each information;

means for distributing the road surface information also to a vehicle other than the vehicle;

means for receiving the distributed road surface information; and means for correcting the numerical information on the slipperiness of the road surface that the vehicle has received by comparing the numerical information on the slipperiness of the road surface that the vehicle has received with the numerical information on a road surface friction coefficient that the vehicle has sensed while travelling.

2. The system of claim 1, wherein the system further includes means for warning a driver at needs on the basis of the numerical information on slipperiness of the road surface that the vehicle has received.

3. The system of any one of claims 1 to 2, wherein the system further includes means for controlling the vehicle on the basis of the numerical information on slipperiness of the road surface that the vehicle has received.

4. The system of any one of claims 1 to 2, wherein the means for sensing numerical information of slipperiness of the road surface converts level of slipperiness of the road surface into a numerical value on the basis of tire revolution behavior caused by the friction coefficient between the tire of each vehicle and the road surface.

5. A system for collecting and distributing vehicle information characterized by collecting information which is transmitted from a first traveling vehicle and needed in preparing road surface information, and distributing the road surface information to a second traveling vehicle, wherein the second vehicle includes means for correcting the road surface information received from the first vehicle by comparing the information received from the first vehicle with a road surface friction coefficient that the second vehicle has sensed while travelling.

6. A device for transmitting vehicle information comprising:

means for sensing numerical information on slipperiness of a road surface while a vehicle is travelling;

means for sensing positional information of the travelling vehicle;

means for transmitting the numerical information and/or positional information from the vehicle, and means for correcting the numerical information on the slipperiness of the road surface that the vehicle has received from another vehicle by comparing the numerical information on the slipperiness of the road surface that the vehicle has received with the numerical information on a road surface friction coefficient that the vehicle has sensed while travelling.

7. A program for controlling a vehicle which comprises a computer which functions as means for sensing numerical information on slipperiness of a road surface while the vehicle is travelling, means for controlling the vehicle on the basis of numerical information on slipperiness of a road surface received by the vehicle, and means for correcting the received numerical information on the slipperiness of the road surface by comparing the numerical information on the slipperiness of the road surface received by the vehicle with the numerical information on a road surface friction coefficient performance of driving control of the vehicle on the basis of the road surface information.

* * * * *